United States Patent
Nandy (10) Patent No.: US 7,620,269 B1
(45) Date of Patent: Nov. 17, 2009

(54) EDGE-BASED CORRELATION IMAGE REGISTRATION FOR MULTISPECTRAL IMAGING

(75) Inventor: Prabal Nandy, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 12/057,226

(22) Filed: Mar. 27, 2008

Related U.S. Application Data (63) Continuation of application No. 10/883,626, filed on Jul. 1, 2004, now abandoned.

(51) Int. Cl.
*G06K 9/32* (2006.01)

(52) U.S. Cl. .................. 382/294; 382/151; 348/263

(58) Field of Classification Search ............. 73/490; 324/115; 348/263, 745, E9.007; 382/151, 382/294; 399/301, 372, 394, 395, 396; 700/57, 700/59, 124

See application file for complete search history.

(56) References Cited

U.S. PATENT DOCUMENTS 5,020,111 A * 5/1991 Weber .................. 382/211

2002/0035419 A1 * 3/2002 Lin ......................... 701/27

FOREIGN PATENT DOCUMENTS

EP 892286 A * 1/1999

OTHER PUBLICATIONS

Yunlong Sheng*a, Xiangjie Yanga, Daniel McReynoldsa, Zhong Zhanga, Langis Gagnonb and Léandre Sévigny; Real-world multisensor image alignment using edge focusing and Hausdorff distances; 1999; Université Laval, Dept. de Physique, Ste-Foy, Qc., Canada G1K 7P4.*

Yunlong Sheng, Xiangjie Yang, Daniel McReynolds, Zhong Zhang, Langis Gagnon and Léandre Sévigny; Real-world multisensor image alignment using edge focusing and Hausdorff distances; 1999; Université Laval, Dept. de Physique, Ste-Foy, Qc., Canada G1K 7P4.*

Haasan Foroosh et al., "Extension of Phase Correlation to Subpixel Registration," 2002 IEEE, pp. 188-200.

Jan-Wei Hsieh et al., "Image Registration Using a New Edge-Based Approach," Computer Vision and Image Understanding, vol. 67, No. 2, Aug. 1997, pp. 112-130.

* cited by examiner

*Primary Examiner*—Andrew W Johns
*Assistant Examiner*—Gregory F Cunningham
(74) *Attorney, Agent, or Firm*—Madelynne J. Farb (57) ABSTRACT

Registration information for images of a common target obtained from a plurality of different spectral bands can be obtained by combining edge detection and phase correlation. The images are edge-filtered, and pairs of the edge-filtered images are then phase correlated to produce phase correlation images. The registration information can be determined based on these phase correlation images.

22 Claims, 5 Drawing Sheets

FIG. 1
(PRIOR ART)

| BAND | WAVELENGTH RANGE (MICRONS) |
|---|---|
| A | 0.45 - 0.52 |
| B | 0.52 - 0.60 |
| C | 0.62 - 0.68 |
| D | 0.76 - 0.86 |
| E | 0.86 - 0.90 |
| F | 0.91 - 0.97 |
| G | 0.99 - 1.04 |
| H | 1.36 - 1.39 |
| I | 1.55 - 1.75 |
| J | 3.50 - 4.10 |
| K | 4.87 - 5.07 |
| L | 8.00 - 8.40 |
| M | 8.40 - 8.85 |
| N | 10.20 - 10.70 |
| O | 2.08 - 2.35 |

FIG. 4
(PRIOR ART)

$$\varepsilon_{x,y} = \frac{\partial L_{x,y}}{\partial x} + \frac{\partial L_{x,y}}{\partial y}$$

EDGE-BASED CORRELATION IMAGE REGISTRATION FOR MULTISPECTRAL IMAGING

The application is a continuation of U.S. patent application Ser. No. 10/883,626, filed on Jul. 1, 2004 now abandoned.

This invention was developed under Contract DE-AC04-94AL8500 between Sandia Corporation and the U.S. Department of Energy. The U.S. Government has certain rights in this invention.

FIELD OF THE INVENTION

The invention relates generally to the registration of plural images of a common target and, more particularly, to registration of a plurality of images obtained from a respectively corresponding plurality of spectral bands.

BACKGROUND OF THE INVENTION

The following documents are incorporated herein by reference:
1. Decker, M. L., R. R. Kay, N. G. Rackley, "Multispectral Thermal Imager (MTI) satellite hardware status, tasking and operations," *Proc. Spie*, vol. 4381, pp. 184-94, 2001.
2. Fonseca, L. M. G., and B. S. Manjunath, "Registration techniques for multisensor remotely sensed imagery," *Journal of Photogrammetry Engineering and Remote Sensing*, vol. 62 (9), p. 1049-1056, September 1996.
3. Brown, L. G. "A survey of image registration techniques," *ACM Computer Survey*, vol. 24, no. 4, pp. 325-376, 1992.
4. Kuglin, C. D., and D. C. Hines, "The phase correlation image alignment method," in *Proc. Int. Conf. Cybernetics Society*, pp. 163-165, 1975.
5. Smith, J. L., S. E. Momomatsu, J. G. Taylor, K. J. Jefferson, and B. R. Stallard, "Semi-autonomous registration of satellite imagery using feature fitting," in *Proc. SPIE*, vol. 4381, pp. 447-454, 2001.
6. Shekarforoush, H., M. Berthod, and J. Zerubia. "Extension of phase correlation to subpixel registration," *IEEE Trans. On Image Processing*, vol. 11, no. 3, pp. 188-200, March 2002.
7. Pope, P., J. Theiler, and A. Galbraith. "LANL experience with coregistration of MTI imagery," in *Proc. SPIE*, vol. 5159, pp. 139-146, 2003.
8. Hsieh, J. W., Liao, H. Y., Fan, K. C., "Image Registration Using a New Edge-Based Approach", *Computer Vision and Image Understanding*, vol. 67, no. 2, pp. 112-130, August 1997.
9. Van der Steen, A. J., "An Evaluation of Some Beowulf Clusters," *Cluster Computer*, vol. 6, issue 4, pp. 287-297, October 2003.
10. Goodman, J. W. *Introduction to Fourier Optics*, p. 9, New York, McGraw-Hill, 1968.

Figure 1:
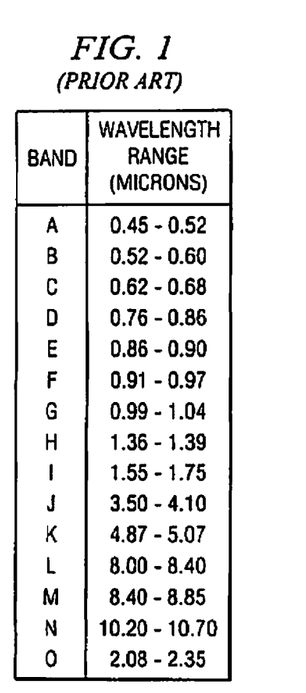
FIG. 1 illustrates in tabular format a plurality of spectral bands which are used in a known system for producing multispectral images.

The Multispectral Thermal Imager Satellite (MTI) is a multispectral pushbroom system that acquires 15 unique spectral bands of data from 0.45-10.7 microns, with resolutions of 5 m for the visible bands and 20 m for the infrared. Scene data are collected on three separate sensor chip assemblies (SCAs) mounted on the focal plane. The MTI satellite was launched on a Taurus rocket into a 1 pm sun-synchronous 595 km orbit on Mar. 12, 2000. Four of the bands are visible near-infrared (VNIR) bands with a 5 m ground sampling distance (GSD), seven are medium-wave infrared (MWIR) with a 20 m GSD, and five are thermal infrared (TIR) with a 20 m GSD. FIG. 1 shows the 15 unique spectral bands.

Figure 2:
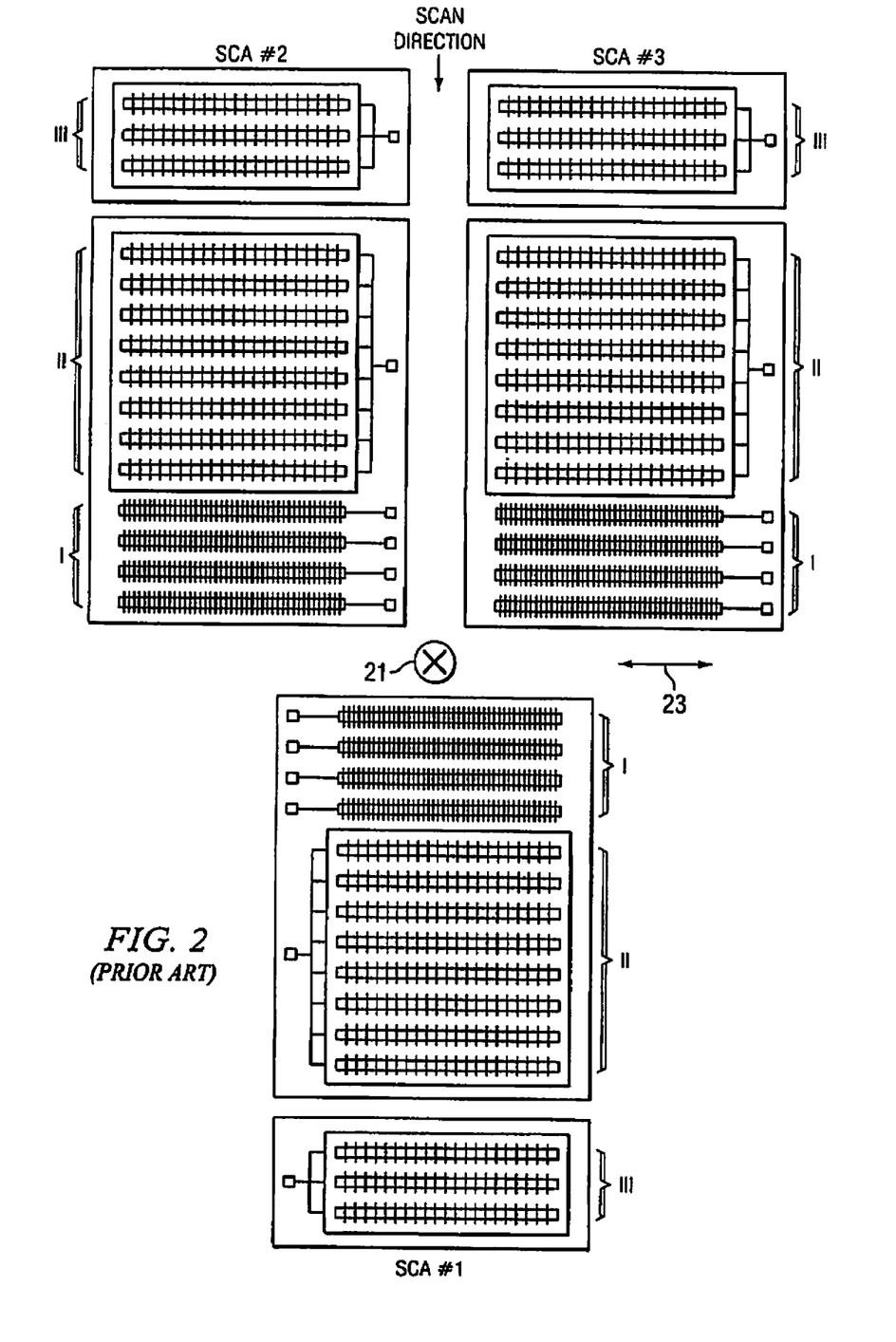
FIG. 2 diagrammatically illustrates a known multispectral image sensing arrangement.

The MTI focal plane is distributed among three identical sensor chip assemblies (SCAs) shown in FIG. 2. The left and right SCAs are rotated 180 degrees with respect to the central SCA so that the VNIR bands for each SCA (see I) are located closest to the optical axis. The optical axis extends perpendicularly to the focal plane, i.e. perpendicularly into the page of FIG. 2, as shown at 21. Each identical SCA contains 832 VNIR pixels and 208 IR pixels in the cross-track direction, which cross-track direction is shown at 23. The inner edges of the left and right SCAs (SCAs 2 and 3) share a small pixel overlap region with central SCA 1. Detector rows for each band are arranged sequentially by order of increasing wavelength and extend away from the optical axis in the along-track direction (i.e., parallel to the scan direction). In FIG. 2, the VNIR bands are located in section I, the MWIR bands in section II, and the TIR bands in section III. Images are created with MTI by sequentially activating detector bands across the ground target, starting with the longest-wavelength band (N) in SCA 1, and ending with band N on SCAs 2 and 3. According to conventional pushbroom operation, each individual row of detectors (corresponding to one of the spectral bands) is activated at a plurality of points in time while moving over the target, thereby producing an image defined by a two dimensional array of pixel data.

The unique arrangement of the MTI focal plane results in 45 separate images (15 bands by 3 SCAs) being delivered for each image collect. These band images are displaced with respect to each other because of the physical difference in their positions on the focal plane and because of spacecraft motion and attitude changes during the (approximately 4 second long) image collections process. To combine these 45 images into a single coregistered MTI image cube (referred to as a level 1R product), both interband misregistration within each SCA and the misregistration between the SCAs themselves must be corrected.

Image registration is a fundamental issue for both image processing and image analysis. Images requiring registration can exhibit temporal changes, viewpoint differences, or unknown scene overlap, and each of these relationships presents a unique registration challenge. With respect to multispectral and hyperspectral sensors, accurate interband registration is critical in order to analyze the spectral nature of the data. Many image registration techniques and the geometric transformations they correct are discussed in the literature. Fonseca outlines the registration problem in four steps: feature identification, feature matching, spatial transformation, and interpolation if necessary (document No. 2 above). Registration techniques can be grouped into the categories of area-based methods and feature-based methods (document No. 3 above). Feature-based methods typically utilize one technique to locate spatially distinct features and another technique to align the bands with respect to those features, thus registering the image. Area-based methods combine feature identification and feature matching into a single step through correlation, but the importance of quality scene features in the image is still of paramount importance.

Phase correlation is an area-based method well suited to detecting translational shift errors between imagery (document No. 4 above). As area-based techniques, most correlations require that the images being registered share a large region of overlap to produce good results. A shifting window is typically used to correlate one small area of a reference image within a larger windowed area of a target image to figure out the point of best registration (document No. 5 above). While images from similar wavelengths tend to look alike, images from different wavelengths can exhibit vastly different features. Several effects make conventional correction between such widely separated spectral bands very difficult. Examples of such effects are contrast reversals between the widely separated bands, and the loss of contrast in respectively different portions of the respective images produced by the widely separated bands. Normalized cross correlation is an area technique traditionally used for translation registration of images from similar wavelengths (document No. 3 above). Cross correlation is dependent only on statistical similarities between pixel intensities, so it does not work well between images from different wavelengths. Phase correlation has several desirable properties such as uniform variations, gain offsets, and constant mean shifts that make it robust against the effects that mislead other correlation techniques (document No. 6 above).

Generation of properly registered MTI image requires two separate registration steps. First, interband registration must be performed on the 15-band cube generated by each of the three SCAs. Second, the registered image cubes from each SCA must be mosaicked together (in the overlapping border regions) to produce the final registered MTI image cube. Several registration techniques have already been developed for MTI imagery, each tailored to a different kind of image product. Los Alamos National Laboratory has developed multiple techniques, among them an automated model-based photogrammetric approach that involves "tweaking" by cross-correlation, (document No. 7 above). Sandia National Laboratories has also developed several registration techniques, including a feature-fitting method (document No. 5 above). In order to guarantee registration accuracy, Sandia currently operates a manual registration tool used in the Sandia Image Processing and Exploitation (SIPEX) image production pipeline for MTI imagery. This manual registration tool is called the Package for Registering Images from MTI (PRISM).

The PRISM tool allows translation registration by manually shifting one MTI band as referenced to another MTI band. The analyst finalizes registration shifts for each band when all image pairs overlay as closely as possible in a given region of an image. These integer-pixel shifts are used in creating the final un-resampled registered image product. Manual registration, however, is a time-consuming process and becomes very difficult when no very distinct features exist in the image. Human time requirements would be reduced significantly if images were automatically registered, and analysts only needed to correct occasional misregistrations in a quality-control step. It is therefore desirable to provide a generalized and robust way to automatically register images, such as images in the MTI SIPEX pipeline.

Exemplary embodiments of the invention use phase correlation with enhancements to achieve robustness. Multispectral images are first gradient-filtered on a band-by-band basis using an edge detection method. As feature edges are typically preserved throughout all bands of a multispectral image, edge-filtering the input images provides robustness over wide wavelength ranges where contrast inversions and other wavelength-dependent intensity changes are common. These gradient images are then phase-correlated, resulting in a correlation surface. The correlation surface can be edge-filtered in a single spatial direction to remove certain correlation effects as needed. The final shift values for the image pair are obtained based on the edge-filtered correlation.

DETAILED DESCRIPTION

The present invention is applicable to any image pair with translational registration error, equal spatial size, and a majority of overlap. Thus, MTI images at 20 m GSD can be resampled to 5 m GSD by conventional pixel replication (without interpolation) to satisfy the condition of equal image pixel size when registering VNIR to MWIR/TIR bands. This pixel replication produces, for each input pixel, a resultant 4×4 array of replicated pixels that are each identical to the input pixel. Some embodiments use the IDL programming language on a 4-node Beowulf parallel-processing machine (see document No. 9 above) with fiber-optic interconnects, each node equipped with dual 1.6 Ghz processors. However, any suitably programmed data processing arrangement can be used to practice the invention.

Exemplary embodiments of the invention perform automated registration of multispectral imagery, wherein a plurality of images of a target are obtained from a corresponding plurality of spectral bands. Phase correlation is performed on edge maps generated from paired bands of image data, and relative shifts between bands can be determined based on the correlation result. Some embodiments apply a spatial filter to the correlation results, and then determine the relative shifts between bands based on the result of the spatial filtering.

Taking the sensor chip assemblies of FIG. 2 as an example, the aforementioned process can be repeated for every combination of band pairs to generate a vector of co-registration results for each sensor chip assembly. Any two of the sensor chip assemblies can then be registered to one another by selecting a common band from both sensor chip assemblies, edge filtering the images from each of the common bands, and phase correlating the edge filtered images. The registration values for that pair of sensor chip assemblies can then be determined based on the phase correlation result. In some embodiments, spatial filtering can be performed on the phase correlation result, and the registration values can be determined based on the spatial filtering result.

The registration values produced by the band-to-band registration operations and the SCA-to-SCA registration operations can be used to produce a linearly shifted un-resampled co-registered image cube.

Figure 3:
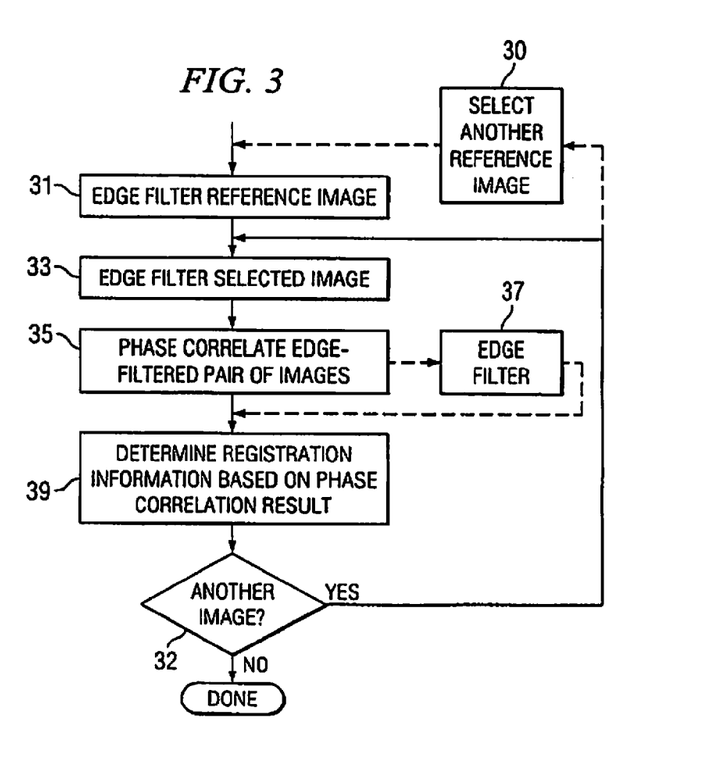
FIG. 3 illustrates exemplary image registration operations according to the invention.

FIG. 3 illustrates exemplary operations of the invention which can perform the above-described functions. FIG. 3 will initially be described in terms of a band-to-band image registration process, but the operations of FIG. 3 are also equally applicable to perform SCA-to-SCA image registration. Generally in FIG. 3, images obtained from first and second spectral bands are edge filtered at 31 and 33, respectively. The resulting edge-filtered images are then phase correlated at 35, and the desired band-to-band registration information is determined at 39 based on the phase correlation result. After the desired registration information has been determined at 39, it is then determined at 32 whether there are any other images from any other bands to be processed. If so, then another band is selected, and its corresponding image is edge filtered at 33. Note that the edge filtering operation at 31 need not be repeated, because this edge filtering operation was already performed on a reference image from a predetermined reference band. The edge-filtered images of the remaining bands are each phase correlated at 35 with the edge-filtered reference image. Some exemplary embodiments utilize band E (see also FIG. 1) as the reference band for the reference image.

Figure 4:
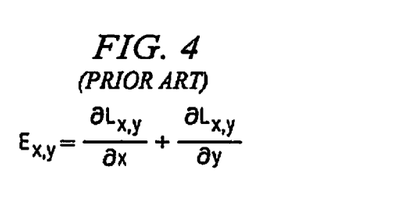
FIG. 4 illustrates a conventional edge filtering operation.

FIG. 4 illustrates a conventional edge filter which can be used in some embodiments to implement the edge filtering operations at 31 and 33 in FIG. 3. In the edge filtering operation of FIG. 4, $E_{x,y}$ is the filter output, and $L_{x,y}$ represents the radiance of a given pixel. In the case of a 5 m resolution VNIR band, dx and dy are 1-pixel intervals. For the pixel-replicated infrared bands, the dx and dy intervals increase to 4 pixels. The x-direction and the y-direction respectively correspond to the aforementioned cross-track and along-track directions. The partial differentiations performed by this conventional edge filter are readily implemented using matrix shifts and subtractions. Because feature edges are typically preserved throughout all bands of a multispectral image, edge filtering the images advantageously provides robustness over the wide wavelength range (see also FIG. 1) where, as mentioned above, contrast inversions and other wavelength-dependent intensity changes are common.

Figure 5:
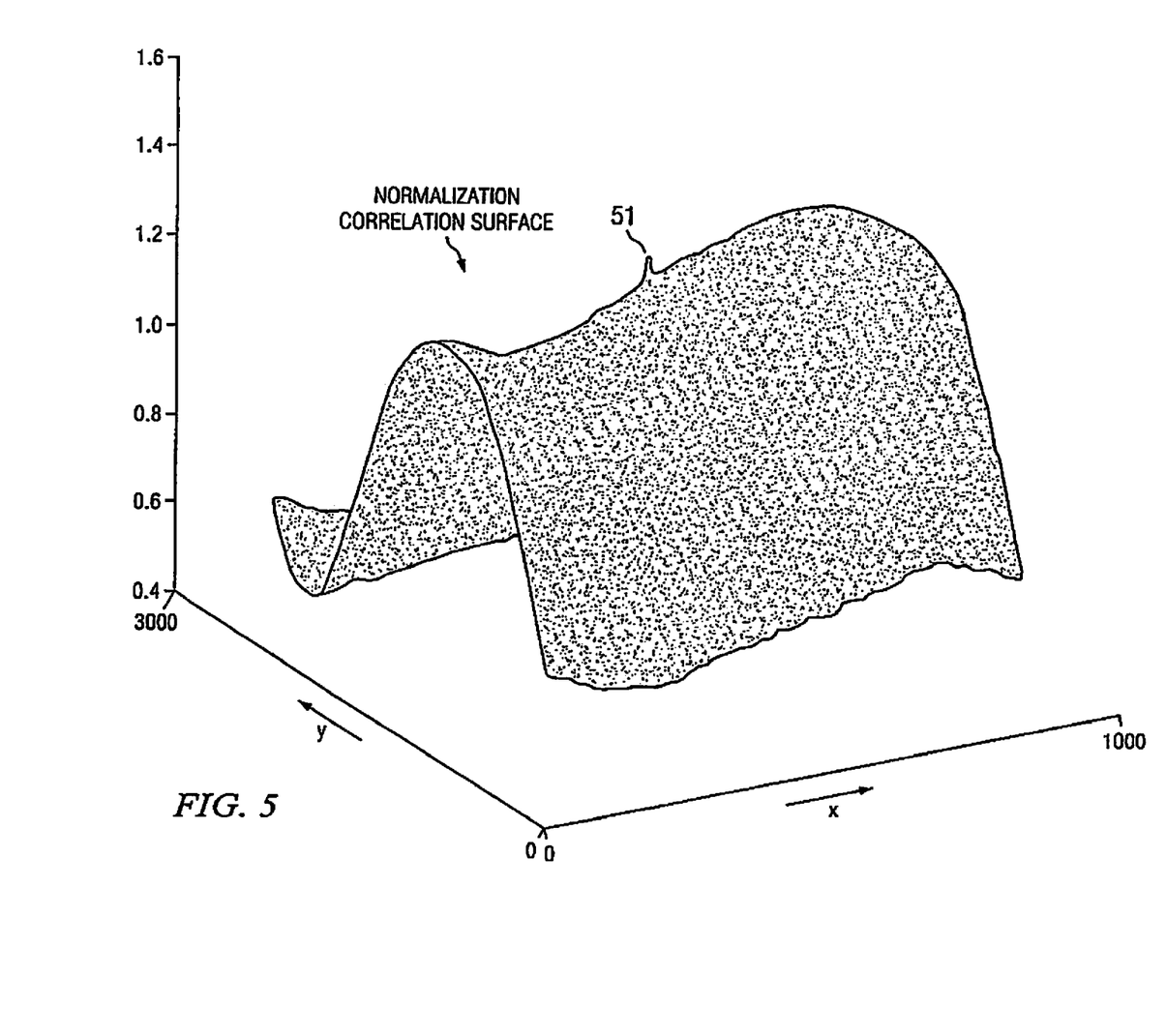
FIG. 5 graphically illustrates a correlation surface produced by the phase correlation operation of FIG. 3.

In some exemplary embodiments, the phase correlation operation at 35 in FIG. 3 utilizes the conventional phase correlation method of Kuglin and Hines (see document No. 10 above). When the two edge-filtered images are phase correlated, the result is a correlation image (or correlation surface). Nominally, the maximum value of this correlation image would be located at the registration point, and its coordinates would be referenced against the center of the image (the no-registration shift point) to calculate the translational misregistration with respect to the reference band. This process can fail, however, in images where most of the edges detected are random, high-spatial-frequency patterns that correlate well with each other across the entire image, or where scene details are obscured by focal plane damage. FIG. 5 illustrates an exemplary phase correlation surface which is produced by the phase correlation operation 35 of FIG. 3 under these types of conditions. The x,y coordinates of the impulse peak 51 of FIG. 5 define the desired registration point. However, in the example of FIG. 5, the impulse peak 51 is not the maximum correlation value of the correlation surface. Rather, at higher x values, the correlation surface of FIG. 5 includes correlation values that are higher than the correlation value at the impulse peak 51. These higher correlation values are high-frequency random correlation values caused, for example, by urban clutter in the image.

Figure 6:
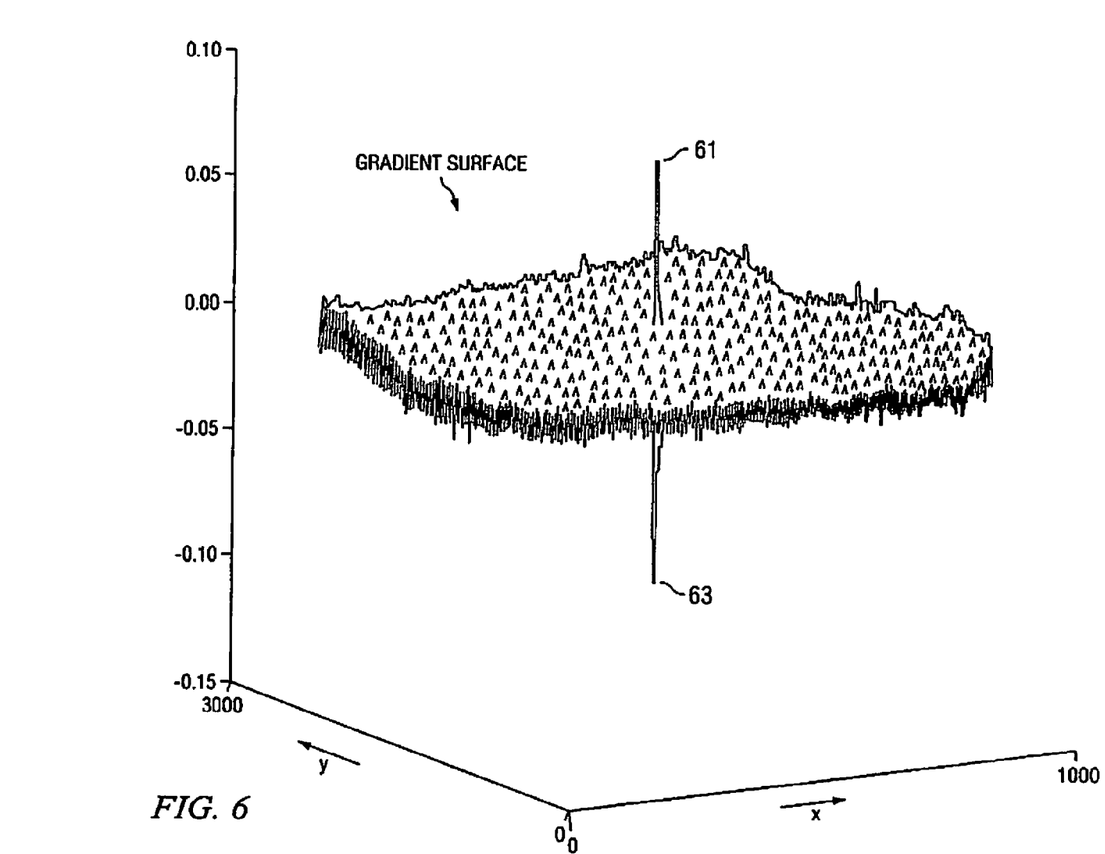
FIG. 6 graphically illustrates a gradient surface produced by edge filtering the phase correlation surface of FIG. 5.

Some exemplary embodiments can compensate for the situation illustrated in FIG. 5, as shown by broken line at 37 in FIG. 3. In these embodiments, the phase correlation result (correlation surface) is edge filtered at 37 in one dimension only. In particular, in order to compensate for situations such as shown in FIG. 5, the edge filtering at 37 is performed in the y-direction only. Thus, in some embodiments which compensate for the situation illustrated in FIG. 5, the edge filter 37 of FIG. 3 could implement the filter operation illustrated in FIG. 4, but utilizing only the second term of that filtering operation to achieve its filtering in only the y-direction. FIG. 6 illustrates an exemplary result of an edge-filtered correlation surface produced by applying y-direction edge filtering at 37 in FIG. 3 to the correlation surface of FIG. 5. The x,y coordinates of the registration point are the x,y coordinates of the Euclidean mid-point between the maximum value 61 and the minimum value 63 of the edge-filtered correlation surface (or gradient surface) of FIG. 6. Comparing FIGS. 5 and 6, the edge-filtered correlation surface of FIG. 6 clearly differentiates the (high derivative) impulse peak 51 near the image center in FIG. 5 from the (low derivative) portions to the right of the impulse peak 51 in FIG. 5. Under conditions such as the exemplary conditions described above, where the phase correlation result must be compensated for, the one-dimensional edge filtering operation 37 can advantageously increase the level of robustness at a relatively low processing cost.

Figure 7:
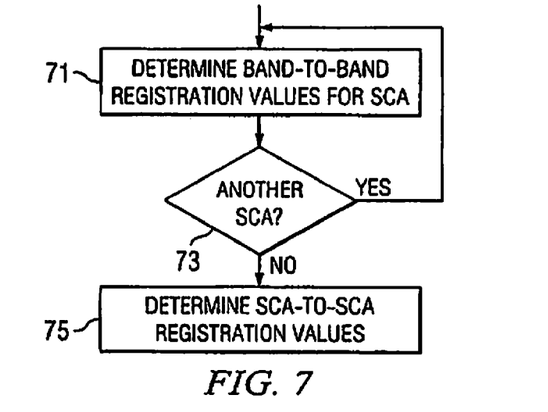
FIG. 7 illustrates an example of how the image registration operations of FIG. 3 can be applied to both band-to-band image registration and sensor chip assembly-to-sensor chip assembly image registration.

FIG. 7 illustrates exemplary operations according to the invention wherein the operations of FIG. 3 are used to perform band-to-band registration and also to perform SCA-to-SCA registration. In FIG. 7, all band-to-band registration values for a given SCA are determined at 71, for example using the exemplary operations of FIG. 3. After it is determined at 72 that all band-to-band registration values for all SCAs have been determined at 71, then operations proceed to 75, where the SCA-to-SCA registration values are determined. The exemplary operations of FIG. 3 can also be used to determine the SCA-to-SCA registration values at 75, as described below.

Each SCA in effect operates as a separate imager that produces an independent 15-band image. Therefore, registration between the three SCAs produces a registered image. The process of registering the SCAs is analogous to that of co-registering images between imagers or between time-separated images from the same imager, e.g., for change detection. As mentioned above, the exemplary operations of FIG. 3 can be utilized to perform the SCA-to-SCA registration. The primary differences from the above-described process of determining band-to-band registration values are the number of images to be co-registered, the number of reference images used, the direction of the one-dimensional correlation surface edge-filtering at 37, and the size of the image inputs.

Taking the SCA arrangement of FIG. 2 as an example, one of the SCAs will be taken as a reference SCA and two SCA-to-SCA registration values will be determined in order register the other two SCAs to the reference SCA. In some exemplary embodiments, the SCA 1 is chosen as the reference for determination of SCA-to-SCA registration values.

Because SCA-to-SCA shifts are large in the cross-track direction (by virtue of the focal plane design), some embodiments perform the one-dimensional edge filtering operation at 37 in FIG. 3 as only an x-direction edge filtering operation.

Continuing with the example of the SCA arrangement of FIG. 2, the focal plane design of that arrangement dictates that, for non-yawed nadir imagery, SCA 1 will overlap both SCA 2 and SCA 3 in the cross-track direction by a maximum of 48 pixels. Some exemplary embodiments select the images for determining the SCA-to-SCA registration value in the manner described below.

First, a common band (for example band A) is selected. Then, the left-most 280 pixels of the common band of SCA 1 and the right-most 280 pixels of that same band of SCA 2 are chosen as the images for use in registering SCA 2 to SCA 1, with the SCA 1 image selected as the reference image. The images for use in registering SCA 3 to SCA 1 are chosen analogously, namely the right-most 280 pixels of a common band (again, for example, band A) of SCA 1 and the left-most 280 pixels of that same band in SCA 3, with the SCA 1 image utilized as the reference image. Referring again to FIG. 3, in order produce the two sets of registration values needed for SCA-to-SCA registration, two passes through the operations of FIG. 3 are performed, each pass utilizing a different 280 pixel-wide reference image obtained from SCA 1, together with the corresponding 280 pixel-wide image obtained from either SCA 2 or SCA 3. The use of a second reference image for the second pass during SCA-to-SCA registration is illustrated by broken line at 30 in FIG. 3.

Figure 8:
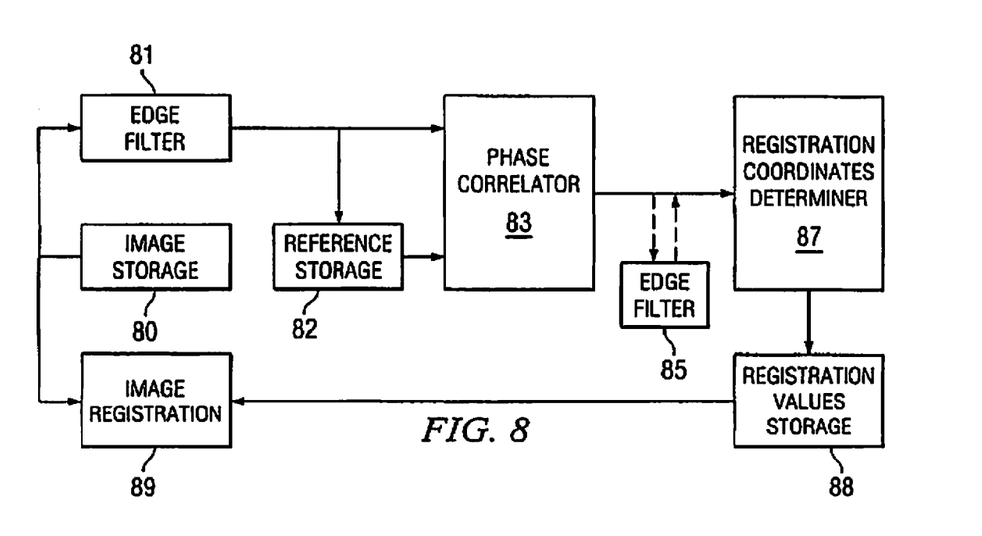
FIG. 8 diagrammatically illustrates exemplary embodiments of an image registration apparatus according to the invention.

FIG. 8 illustrates exemplary embodiments of an image registration apparatus which can perform the exemplary operations illustrated in FIGS. 3-7. With all of the images collected by all of the sensor chip assemblies initially stored in image data storage 80, the image information is input to a two-dimensional (x, y) edge filter 81. The reference image can be applied to the edge filter 81 first, and the result stored in memory at 82. Thereafter, each of the other images can be edge filtered at 81, and then phase correlated with the edge filtered reference image at 83. The result of the phase correlation can, in some embodiments, be passed directly to the registration coordinates determiner 87. In such embodiments, the registration coordinates determiner 87 selects the coordinates of the maximum value of the phase correlation result produced by the phase correlator 83. These coordinates are then stored in registration coordinate storage 88.

In some embodiments which compensate for the circumstances described above with respect to FIG. 5, the phase correlation result produced by the phase correlator 83 is one-dimensionally edge filtered at 85 (shown by broken line in FIG. 8), either in the x-direction in the case of SCA-to-SCA registrations, or in the y-direction in the case of band-to-band registrations. The edge filtered result is input to the registration coordinates determiner 87, which determines the mid-point between the maximum and minimum values produced by the one-dimensional edge filter 85, and selects the x,y coordinates of that mid-point to be the desired registration coordinates for storage at 88.

The band-to-band and SCA-to-SCA registration coordinates stored at 88 can be provided to an image registration unit 89, for example the PRISM tool in the SIPEX pipeline. A user of the image registration unit 89 has the option of adjusting and changing the registration values stored at 88 in order to optimize the registration of the image (or to correct errors). Ultimately, the image registration unit 89 utilizes the original image data stored at 80 together with the registration coordinates stored at 88 to create and display registered imagery.

Taking the example of an image registration unit that includes the aforementioned PRISM tool, the PRISM software uses band A (see also FIG. 1) as its reference band, so the image registration unit 89 can account for this difference in reference images by simply subtracting the stored registration coordinates of band A from the stored registration coordinates of each of the other bands.

Some exemplary embodiments implement an error detection mechanism whereby any registration values that exceed 150 pixels in either the x or y directions are discarded. Some unusual imaging conditions, such as extreme yawing of the satellite, can result in registration offsets much greater than 150 pixels, so the error detection mechanism can detect this situation.

Although exemplary embodiments of the invention have been described above in detail, this does not limit the scope of the invention, which can be practiced in a variety of embodiments.

What is claimed is:

1. A method of obtaining registration information indicative of a misregistration between first and second images of a target, comprising:
    edge filtering the first image to produce a first edge-filtered image;
    edge filtering the second image to produce a second edge-filtered image;
    phase correlating the first and second edge filtered images to produce a phase correlation image; and
    using the phase correlation image to determine the registration information.

2. The method of claim 1, wherein said edge filtering steps include partially differentiating the image relative to respective along-track and cross-track directions of the image.

3. The method of claim 1, wherein said using step includes identifying a maximum value of the phase correlation image.

4. The method of claim 1, wherein said using step includes filtering the phase correlation image to produce a filtered phase correlation image.

5. The method of claim 4, wherein said step of filtering the phase correlation image includes edge filtering the phase correlation image.

6. The method of claim 5, wherein said step of edge filtering the phase correlation image includes edge filtering the phase correlation image in only one of a cross-track direction and an along-track direction of the phase correlation image.

7. The method of claim 4, wherein said using step includes identifying a mid-point between maximum and minimum values of the filtered phase correlation image.

8. The method of claim 1, wherein the first and second images are respectively obtained from first and second spectral bands that differ from one another.

9. The method of claim 8, wherein the first spectral band is a MWIR band, and wherein the second spectral band is one of a VNIR band and a TIR band.

10. The method of claim 1, wherein the first and second images are obtained from a common spectral band.

11. The method of claim 1, including edge filtering a third image of the target to produce a third edge filtered image, phase correlating the first and third edge filtered images to produce a further phase correlation image, and using the further phase correlation image to determine registration information indicative of a misregistration between the first and third images.

12. The method of claim 11, wherein the first, second and third images are obtained respectively from first, second and third spectral bands that each differ from one another.

13. The method of claim 12, wherein the first, second and third spectral bands are MWIR, VNIR and TIR bands, respectively.

14. A method of obtaining registration information for use in registering images of a target produced by a plurality of separate sensor arrangements, comprising:
    providing sets of images of the target, each set of images produced by a respectively corresponding one of the sensor arrangements;
    for each set of images, edge filtering each of the images to produce respectively corresponding edge-filtered images, phase correlating a plurality of pairs of the edge-filtered images to produce a corresponding plurality of phase correlation images, and using the phase correlation images to determine registration information indicative of misregistrations between images of the set; and
    selecting from each of the sets of images a portion of that set of images, edge filtering each of the portions to produce respectively corresponding edge-filtered portions, phase correlating a plurality of pairs of the edge-filtered portions to produce a corresponding plurality of phase correlation portions, and using the phase correlation portions to determine registration information indicative of misregistrations between the sets of images.

15. The method of claim 14, wherein each said portion is a portion of one of the images of the associated set of images.

16. The method of claim 14, wherein the images of each set are obtained from respective spectral bands that differ from one another, and wherein all of said image portions are obtained from a common spectral band.

17. An apparatus for obtaining registration information indicative of a misregistration between first and second images of a target, comprising:
   an edge filter for edge filtering the first and second images to produce first and second edge-filtered images;
   a phase correlator coupled to said edge filter for phase correlating the first and second edge-filtered images to produce a phase correlation image; and
   a registration determiner coupled to said phase correlator for determining the registration information based on the phase correlation image.

18. The apparatus of claim 17, including a filter coupled between said phase correlator and said registration determiner for filtering the phase correlation image to produce a filtered phase correlation image, said registration determiner for determining the registration information in response to the filtered phase correlation image.

19. The apparatus of claim 18, wherein said last-mentioned filter is an edge filter.

20. The apparatus of claim 17, wherein the first and second images are respectively obtained from first and second spectral bands that differ from one another.

21. The apparatus of claim 20, wherein the first spectral band is a MWIR band, and wherein the second spectral band is one of a VNIR band and a TIR band.

22. A method of obtaining registration information indicative of a misregistration between first and second images of a target, comprising:
   edge filtering the first image to produce a first edge-filtered image;
   edge filtering the second image to produce a second edge-filtered image;
   phase correlating the first and second edge filtered images to produce a phase correlation image; and
   determining the registration information by edge filtering the phase correlation image in only one of a cross-track direction and an along-track direction of the phase correlation image to produce a filtered phase correlation image.

* * * * *